United States Patent
Van Der Laan et al.

(10) Patent No.: US 6,824,483 B1
(45) Date of Patent: Nov. 30, 2004

(54) CONTROL SYSTEM FOR CONTINUOUSLY VARIABLE TRANSMISSION AND CONTINUOUSLY VARIABLE TRANSMISSION WHEREIN SUCH IS UTILIZED

(75) Inventors: Maajke Van Der Laan, Tilburg (NL); Joachim Luh, Bietigheim-Bissingen (DE)

(73) Assignees: Van Doorne's Transmissie, Tilburg (NL); Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/088,015
(22) PCT Filed: Sep. 15, 1999
(86) PCT No.: PCT/EP99/07000
§ 371 (c)(1), (2), (4) Date: Jul. 25, 2002
(87) PCT Pub. No.: WO01/20198
PCT Pub. Date: Mar. 22, 2001

(51) Int. Cl.[7] .............................................. F16H 61/06
(52) U.S. Cl. ........................................ 474/28; 474/18
(58) Field of Search .......................... 474/28, 18, 69, 474/70; 477/49, 45, 48, 43

(56) References Cited

U.S. PATENT DOCUMENTS

| | | | | |
|---|---|---|---|---|
| 4,479,356 A | * | 10/1984 | Gill | ............................ 180/165 |
| 4,515,041 A | * | 5/1985 | Frank et al. | .................... 477/49 |
| 4,628,773 A | * | 12/1986 | Itoh et al. | ...................... 474/28 |
| 4,702,725 A | | 10/1987 | Kouno et al. | |
| 4,718,306 A | * | 1/1988 | Shigematsu et al. | .......... 477/45 |
| 4,790,214 A | * | 12/1988 | Hattori et al. | ................. 477/48 |
| 5,257,960 A | | 11/1993 | Sato | |
| 5,569,114 A | | 10/1996 | Matsuda et al. | |
| 5,707,314 A | | 1/1998 | Kashiwabara et al. | |

FOREIGN PATENT DOCUMENTS

| | | | | |
|---|---|---|---|---|
| DE | 4331266 A1 | * | 3/1995 | ............ F16H/61/00 |
| EP | 0 969 230 | | 1/2000 | |
| EP | 1099886 A | * | 5/2001 | ............ F16H/61/00 |
| JP | 60-101352 A | * | 6/1985 | ............. F16H/9/18 |
| JP | 06-185603 A | * | 7/1994 | .................... 477/46 |

* cited by examiner

*Primary Examiner*—Marcus Charles
(74) *Attorney, Agent, or Firm*—Young & Thompson

(57) ABSTRACT

A control system for a continuously variable transmission and continuously variable transmission wherein such is utilised, includes a drive belt located between pulley discs of a first pulley and of a second pulley, the pulleys being rotatable at a rotational speed and being operable by a first and a second piston/cylinder assembly respectively. The control system controls the respective cylinder pressure in the first and second piston/cylinder assemblies, at least based on a torque signal representing the torque to be transmitted by the transmission and two speed signals representing the rotational speeds of the first and second pulley, for clamping the drive belt between the discs thereby enabling torque transmission between the pulleys and the drive belt.

19 Claims, 4 Drawing Sheets

CONTROL SYSTEM FOR CONTINUOUSLY VARIABLE TRANSMISSION AND CONTINUOUSLY VARIABLE TRANSMISSION WHEREIN SUCH IS UTILIZED

BACKGROUND OF THE INVENTION

The invention relates to a control system for a continuously variable transmission or CVT.

DESCRIPTION OF THE RELATED ART

Such control system and CVT are generally known, for example from the European patent publication EP-A-0.451.887. The CVT comprises a first rotatable pulley and a second rotatable pulley both provided with two pulley discs and with a piston/cylinder assembly for urging the pulley discs towards each other under the influence of a hydraulic cylinder pressure in the piston cylinder assembly. The pulley discs exert a clamping force on a drive belt, which is located between the pulley discs, such that torque transmission between the pulleys and the drive belt is enabled. The clamping force and the coefficient of friction between drive belt and pulley discs determine the maximum torque at which the torque transmission occurs virtually without mutual movement of drive belt and pulley discs, i.e. without belt slip. The ratio between the cylinder pressure in the piston/cylinder assembly of the first pulley and that in the piston/cylinder assembly of the second pulley determines the transmission ratio, i.e. the ratio between a rotational speed of the first and second pulley. The control system is capable of both clamping force control and transmission ratio control through determining the cylinder pressure for each of the pulleys. To this end the known control system is provided with a hydraulic circuit connecting the piston/cylinder assemblies to a pump and a reservoir for hydraulic medium and comprising two electronically controllable valves. The control system is furthermore provided an electronic control unit generating a respective control current for each valve in the hydraulic circuit at least based on a torque to be transmitted and on the rotational speed of the pulleys.

In the known control system the electronic control unit comprises two independently operating modules. A first module takes care of the clamping force control by setting the cylinder pressure in the piston/cylinder assembly of the first pulley through generating a first control current operating a first valve. Since the mechanical efficiency of the CVT decreases with increasing clamping force, the control system is usually arranged such that the cylinder pressure in the piston/cylinder assembly of the first pulley is maintained at a lowest possible level without belt slip occurring. Thereto the control system determines the minimum cylinder pressure in the first piston/cylinder assembly needed to prevent slip of the drive belt based on a torque to be transmitted by the transmission. In the known art the torque to be transmitted by the transmission is approximated on the safe side by adding to the actual torque level a value of 0.3 times the maximum possible torque level. Thus, the safety factor with which the actual torque level is multiplied to calculate the torque to be transmitted by the transmission is thus 1.3 at the maximum possible torque to be transmitted, but increases rapidly with a decreasing level of the torque to be transmitted. The technical effect of applying a safety factor being that belt slip is prevented in a manner and at a level practically satisfactory, even during abrupt and/or unpredicted changes in the torque to be transmitted. A second module takes care of the transmission ratio control by setting the cylinder pressure in the piston/cylinder assembly of the second pulley through generating a second control current operating a second valve.

SUMMARY OF THE INVENTION

It is an object of the invention to provide for a solution to the desire to improve the performance and efficiency of the CVT by lowering the safety factor while still effectively preventing slip of drive belt.

Although, in general the known control system provides a simple and stable CVT control, it was found that after prolonged use, drive belts can show an unexpected amount of wear having a slight adverse effect on the durability of the CVT. It is a further object of the present invention to identify the problem underlying unexpected wear of the drive belt and to provide for a solution, thereby improving the durability of the CVT.

It was found that the wear is due to the occurrence of mutual movement of drive belt and pulley discs, i.e. belt slip, which suggested that during operation of the CVT situations can occur wherein the clamping force control is unable to adequately prevent belt slip. So, even though in the known art a relatively large safety factor is applied to the value for the torque to be transmitted, belt slip still remains a problem. These practical findings suggest that it is not possible to lower the safety factor without compromising the durability of the drive belt.

From U.S. Pat. No. 5,707,314 a control system is known that is characterised by the feature that it determines a minimum cylinder pressure to prevent belt slip not only for the first pulley, but also for both for the first and the second pulley. In effect this means the clamping forces of both pulley are explicitly calculated. Based on these minimum cylinder pressures and on the ratio between the rational speeds of the first and second pulley, i.e. the transmission ratio, the control system then determines and controls both cylinder pressures to be equal, or higher than, the respective minimum cylinder pressure. With such system belt slip both on the first and second pulley may be prevent in most operational conditions.

However, according to the invention, it appeared that belt slip occurred at a high rate of change of the transmission ratio. It was furthermore found that the belt slip occurs between the pulley discs of a specific pulley and more in particular, in case of the CVT known from EP-A-0.451.887, the pulley discs of the second pulley, being the pulley used to control the transmission ratio.

According to the invention the control system and CVT having the below discussed features advantageously prevents the occurrence of belt slip and in doing so provides for a CVT with an improved durability and efficiency.

It is noted that the control system according to the invention determines both the cylinder pressure in the first and in the second piston cylinder assembly. It is common practice to use a feedback loop, wherein the actual value of a variable is fed back into a control system, when determining the variable. Therefore, it would appear that the control system according to the invention needs to be provided with two pressure sensors, one for each cylinder pressure. However, according to the invention, sufficient accuracy may be obtained, if only one cylinder pressure is measured using a pressure sensor and the other cylinder pressure is calculated from the measured cylinder pressure and the rotational speed of the pulleys as well as some transmission parameters. The cost of an additional pressure sensor thus being avoided.

Another advantage of the invention is that the approximation of the torque to be transmitted by the transmission may be made less safe compared to the known art without compromising the durability of the CVT. It was found that, when using the control system according to the invention, the torque to be transmitted by the transmission may be approximated by taking the level of the actual torque for each of the first and second pulley multiplied by a safety factor which is equal to 1.3 in a predominant part of a range of actual torque levels. The specific size of the part depends on the transmission ratio. In this manner a significant improvement of the overall efficiency of the transmission may be achieved.

According to the invention a cylinder pressure is maintained at a substantially higher level when a rate of change of the transmission ratio is relatively large than when the transmission ratio is constant. This may for example be effected by increasing the safety factor with an increasing rate of change of the transmission ratio. Since it was found that belt slip mainly occurs during a changing transmission ratio, the technical effect of this measure is that belt slip is prevented and that the performance and durability of the CVT is improved. According to the invention the relationship between the rate of change, RC, of the transmission ratio is given by the following equation:

$$RC = -M_{Nf/Ns} \cdot Ns \cdot Ff \cdot \left(KsKf - \frac{Fs}{Ff}\right)$$

wherein:
$M_{Nf/Ns}$ is an experimentally determined (positive) parameter which varies with the ratio of the rotational speeds of the pulleys (4, 5),
Ff is the force with which the drive belt (1) is clamped between the discs (8, 9) of the first pulley (4),
Fs is the force with which the drive belt (1) is clamped between the discs (10, 11) of the second pulley (5),
KsKf is the ratio of the forces Fs and Ff at which the rate of change would be zero.

From the equation it may be concluded that, if the transmission ratio defined as the rotational speed of the first pulley divided by the rotational speed of the second pulley increases, a desired rate of change of the transmission ratio may only be achieved at a certain minimum Fs and thus at a certain further minimum cylinder pressure in the piston/cylinder assembly of the second pulley. If the transmission ratio decreases, a desired rate of change of the transmission ratio may only be achieved at a certain minimum Ff and thus at a certain further minimum cylinder pressure in the piston/cylinder assembly of the first pulley. Thus, if the control system of the CVT is provided with an input signal representing a desired rate of change of the transmission ratio, a further minimum cylinder pressure may be determined either for the first or for the second pulley using the equation. Based on this further minimum cylinder pressure, on the minimum cylinder pressures and on the transmission ratio, the control system may then determine and control both cylinder pressures to be equal to, or higher than, the respective minimum and/or further minimum cylinder pressures. In this manner it is at all times possible to effectively prevent belt slip both between the pulley discs of the first and of the second pulley and to reliably achieve a desired rate of change of the transmission ratio.

According to a further development of the invention, the control system is provided with change rate restriction means that are capable restricting the rate of change of the transmission ratio in case the flow of hydraulic medium delivered by the pump is insufficient to maintain the desired cylinder pressures. The change rate restriction means may be able to determine the difference between the actual flow of hydraulic medium delivered by the pump and the flow required to achieve the further minimum cylinder pressure and thus to achieve the desired rate of change. The change rate restriction means are then arranged such that, as long as the difference is negative, the desired rate of change is reduced. Alternatively, the change rate restriction means may be able to determine whether the hydraulic system is capable of controlling an actual cylinder pressures to a desired level. If the change rate restriction means detect that the actual cylinder pressure does not reach the desired level, the desired rate of change is reduced. The change rate restriction means ensure that the hydraulic system is at all times capable of generating the further minimum cylinder pressure and belt slip is prevented even when the originally desired rate of change of the transmission ratio would yield belt slip.

As is known in the art, the response of the hydraulic system and of rotating parts of the transmission to a change in the control currents generated by the electronic control unit is often non-linear. Because of the non-linear response the control system is usually unable to accurately control the cylinder pressures to their respective desired level. This non-linear behaviour has an adverse effect on the accuracy with which the cylinder pressures may be controlled and therewith on the efficiency of the transmission. It is, for instance, not feasible to use the integrating action of a PID-regulator due to the non-linear behaviour. Fast changes of the transmission ratio are difficult or even impossible to achieve reliably, because for in this case relatively large differences between the cylinder pressure of the first and of the second pulley are needed, in which case the non-linear behaviour is even more pronounced. This is especially important if a relatively small safety factor is adopted, as is allowed by control system according to the invention. It is therefore advantageous for the control system to be able to account for the non-linear response of the transmission. To this end the control system may be provided with linearisation module containing a mathematical representation of a mass balance of the hydraulic system. Such a mass balance may be construed in a known manner from the flow of hydraulic medium circulated by the pump, the flow characteristic of the valves, and the flow to and from the piston/cylinder assemblies when the transmission ratio changes. Incorporating leakage flows and a value for the compressibility of the hydraulic medium in the mass balance can improve the accuracy of the control system even further. The mathematical representation of the mass balance is incorporated in the linearisation module of the control system such that the system can determine one or more control current required for effecting a desired pressure response in the hydraulic circuit. In a further development of the invention the mathematical representation is contained in a sub-unit which is physically separable from the electronic control unit. This allows the control system to be easily adopted to several layouts of the hydraulic system by exchanging the sub-unit.

According to the invention it is preferable to use a mathematical representation of the hydraulic circuit based on flows of hydraulic medium, because the flows may be derived directly from known transmission variables such as the rotational speed of a pulley drivingly associated with the pump and the rate of change of the transmission ratio, which determines the flows to and from the piston/cylinder assemblies of the pulleys.

According to a further elaboration of the invention the electronic control unit may comprise separate control modules for clamping force control and for transmission ratio control. The first control module controls the clamping force and is capable of generating a first control current for operating the first valve and the second control module controls the transmission ratio and is capable of generating a second control current for operating the second valve. This set-up of the electronic control unit is particularly suited for a hydraulic system wherein the first valve is a pressure control valve which determines the cylinder pressure of the first pulley and the second valve is a flow control valve which controls a flow of hydraulic medium to and from the piston/cylinder assembly of the second pulley. This type of hydraulic system allows the cylinder pressure of the second pulley to become only as high as the cylinder pressure of the first pulley. However, the design of the piston/cylinder assemblies is such that clamping force of the first pulley can become higher than that of the second pulley. The second control module incorporates both a PI-regulator and the linearisation module, so that the control of the cylinder pressure of the second pulley is more accurate and the transmission ratio is controllable with a high degree of accuracy. The first control module determines the minimum cylinder pressures and the further minimum cylinder pressure, as well as a desired ratio of the first and second cylinder pressures, based on torque signal representing a torque to be transmitted by the transmission multiplied by a safety factor, signals representing the rotational speed of the pulleys and a signal representing a desired rate of change of the transmission ratio. Subsequently, the first control module selects the cylinder pressure for the first pulley to be the highest of a cylinder pressure:

- given by the minimum cylinder pressure in the piston/cylinder assembly of the first pulley, or
- given by the desired ratio of the first and second cylinder pressures and a minimum cylinder pressure in the piston/cylinder assembly of the second pulley, or
- given by the further minimum cylinder pressure in the piston/cylinder assembly of the first pulley, or
- given by the desired ratio of the first and second cylinder pressures and a further minimum cylinder pressure in the piston/cylinder assembly of the second pulley.

Based on a pressure difference signal representing the difference between the highest cylinder pressure of the first pulley and the actual cylinder pressure of the first pulley measured by means of a pressure sensor and on the valve pressure/current characteristic, an appropriate control current for operating the first valve is generated by the first module. The second control module determines the transmission ratio by controlling the rotational speed of the second pulley based on a speed difference signal representing the difference between a measured rotational speed of the second pulley and a desired rotational speed of the second pulley which is calculated from the measured rotational speed of the first pulley and the desired transmission ratio. The first and second control modules are capable of mutually providing each other with a signal at least representing the cylinder pressure in the first piston cylinder assembly and the desired rotational speed of the second pulley. This elaboration of the invention has the advantage, that the control system may be used in combination with the so called Master/Slave hydraulic layout which is widely used in contemporary CVTs and provides for a relatively simple and cost effective transmission control.

According to the invention the CVT is suited for application in a motor vehicle having an engine with an engine shaft and a drive shaft for driving driven wheels of the vehicle, in which case it is preferred that the first pulley is drivingly connected to the first pulley and the engine shaft is drivingly connected to the second pulley. The control system and CVT according to the invention are particularly suited for use in combination with an adjustable clutch applied in the torque path between engine and driven wheels, which clutch is adjusted to be capable of transmitting a maximum amount of torque, the maximum amount of torque being smaller than a torque transmittable by the continuously variable transmission without relative movement between the drive belt and the pulley discs. The technical effect of such a combination of adjustable clutch and CVT according to the invention being that belt slip virtually eliminated and that a small safety factor may be applied improving the fuel efficiency of the motor vehicle.

BRIEF DESCRIPTION OF THE INVENTION

The invention will now be elucidated further with reference to the figures.

DESCRIPTION OF THE PREFERRED EMBODIMENTS

Figure 1:
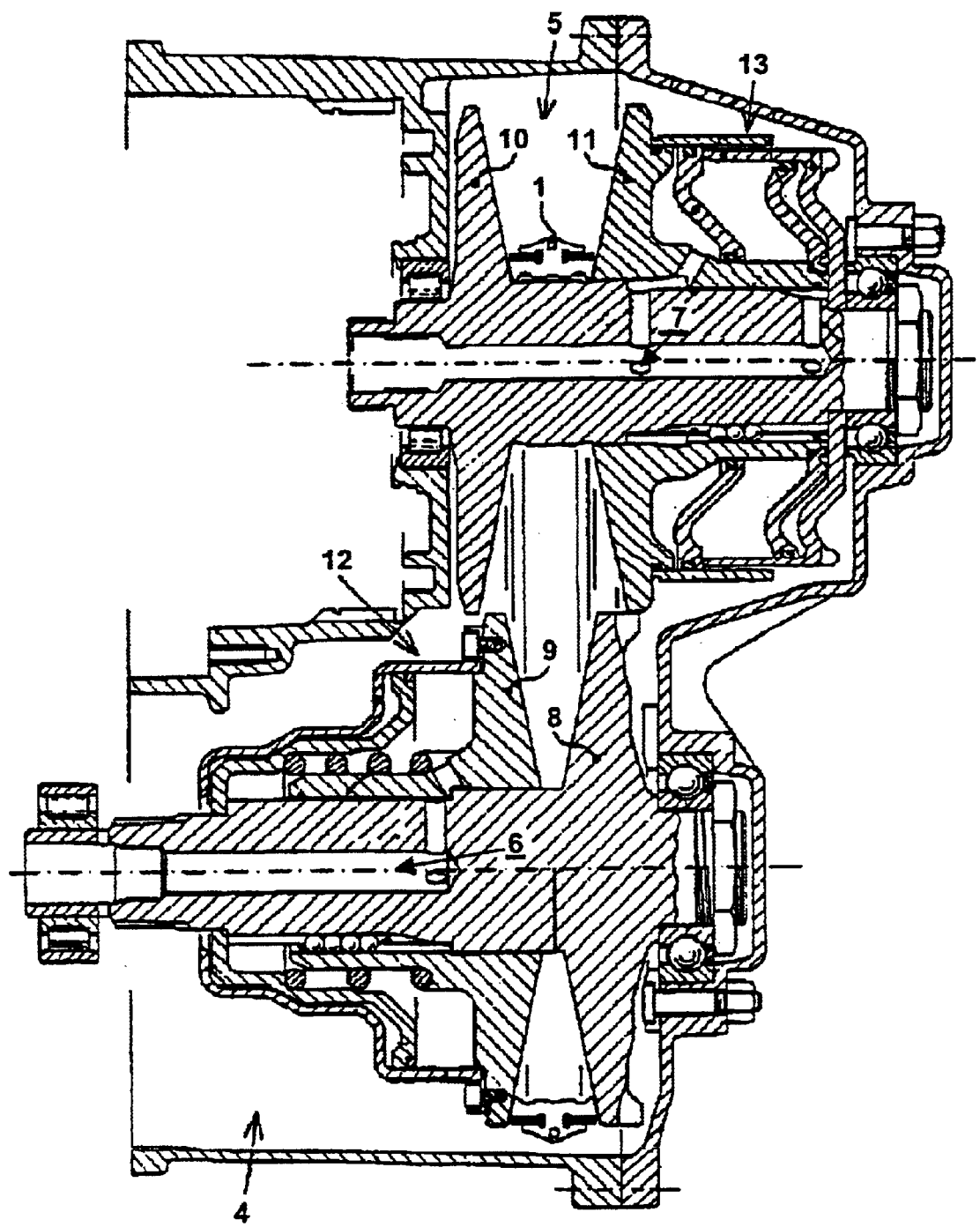
FIG. 1 shows a mechanical layout of a CVT according to the prior art.

In FIG. 1 a schematic representation of a CVT is shown. The CVT comprises a first rotatable pulley 4 and a second rotatable pulley 5 both provided with two pulley discs 8, 9 and 10, 11 respectively as well as a piston/cylinder assembly 12, 13 respectively for urging the pulley discs 8, 9, 10 and 11 towards each other under the influence of a hydraulic cylinder pressure Pf and Ps respectively in the piston cylinder assembly 12, 13 respectively. The pulley discs 8, 9, 10 and 11 exert a clamping force on a drive belt 1, which is located between the pulley discs 8, 9, 10 and 11, such that torque transmission between the pulleys 4 and 5 and the drive belt is enabled. The cylinder pressures Pf and Ps are maintained by allowing hydraulic medium to and from the respective piston cylinder assembly 12 and 13 via channels 6 and 7. The clamping force and the coefficient of friction between the pulley discs 8, 9, 10, and 11 and the drive belt 1 determine the maximum torque at which the torque transmission occurs virtually without mutual movement of drive belt 1 and pulley discs 8, 9, 10 and 11. The ratio between the cylinder pressure Pf and Ps determines the transmission ratio, i.e. the ratio between a rotational speed of the pulleys 4 and 5. The CVT is thus capable of transmitting an amount of torque from the first pulley 4 to the second pulley 5 at a transmission ratio which is continuously variable within a range of possible transmission ratios. Such CVTs are widely used in particular in automotive applications.

Figure 2:
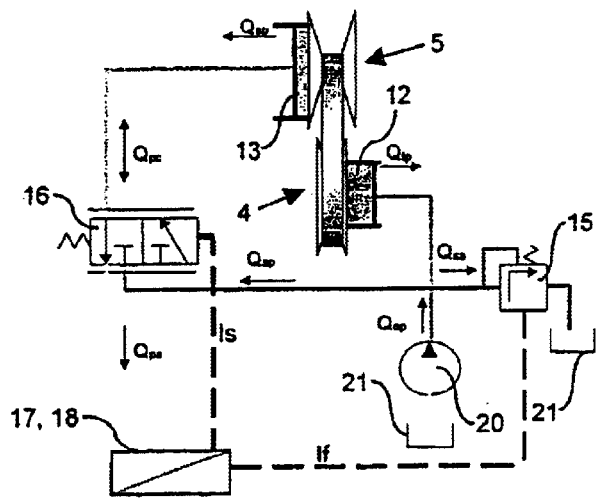
FIG. 2 shows a electro-hydraulic control system according to the prior art.

The electro-hydraulic control system 15, 16, 17, 18, 20, 21 shown in FIG. 2 is generally known as the Master/Slave hydraulic layout, since at any given time the cylinder pressure Ps in the piston/cylinder assembly 13 of the second or slave pulley 5 is bound by the level of the cylinder pressure Pf in the piston/cylinder assembly 12 of the first or Master pulley 4. The piston/cylinder assembly 13 of the second pulley 5 has a larger piston surface area than that of the first pulley 4, so that, although the pressure ratio Ps/Pf is 1 at most, the ratio of the clamping force exerted by the first pulley and the clamping force of the second pulley 5 may become larger than 1. Usually the ratio between the piston surfaces of the second pulley 5 and the first pulley 4 is about 2 to 2.5. The main functions of the control system 15, 16, 17, 18, 20, 21 are to, on the one hand, control the cylinder pressures Pf and Ps in the first and second piston/cylinder assemblies 12, 13, so that a desired speed ratio of the rotational speeds of the pulleys 4 and 5 is maintained, i.e. ratio control, and to, on the other hand, ensure that torque can be transmitted between the drive belt 1 and the first and second pulleys 4 and 5 virtually without mutual relative movement, i.e. clamping force control.

The control system 15, 16, 17, 18, 20, 21 is provided with a hydraulic circuit 15, 16, 20, 21 having two valves 15 and 16 as well as with an electronic control unit 17, 18, 19 comprising two control modules for generating control currents If and Is to operate the valves 15 and 16. A Pump 20 is present for generating a flow of hydraulic medium from a reservoir 21. The valves 15 and 16 determine the cylinder pressure Pf and Ps in the first and in the second piston/cylinder assembly 12 and 13 respectively by allowing hydraulic medium from the pump 20 to the assemblies 12 and 13. Excess medium in the hydraulic system is discharged into the reservoir 21. In the known art, the electronic control unit 17, 18 has a first control module 17 which performs the clamping force control and a second control module 18 which performs the ratio control. The clamping force control and the ratio control are completely independent, so that a simple and adjustable control system 15, 16, 17, 18, 20, 21. Such an approach, however, has the disadvantage mentioned in the above.

Figure 3:
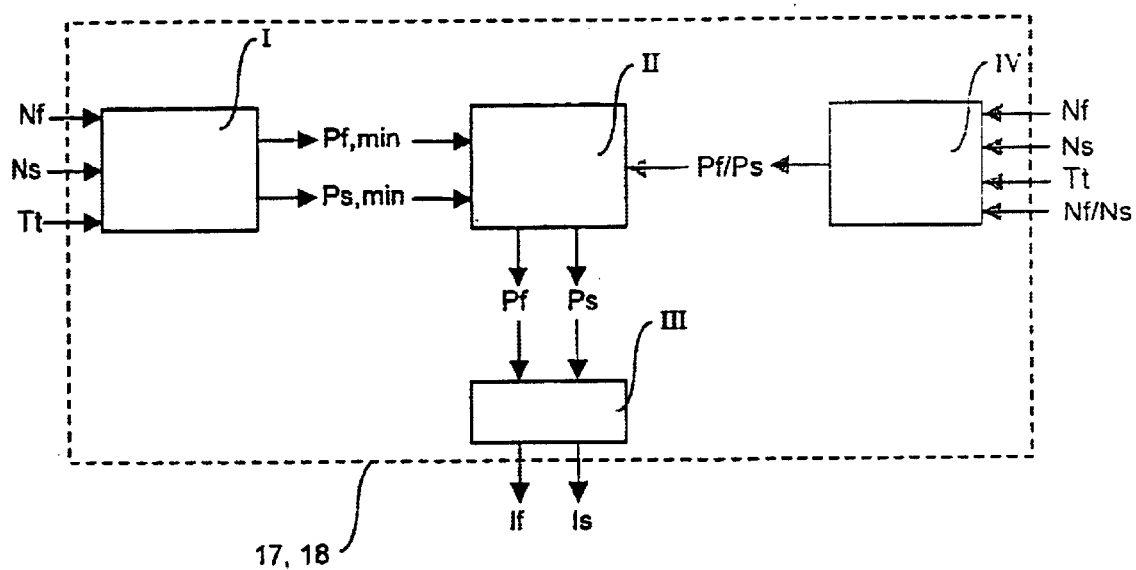
FIGS. 3 through 5 are schematic representations of control systems according to the invention.
Figure 4:
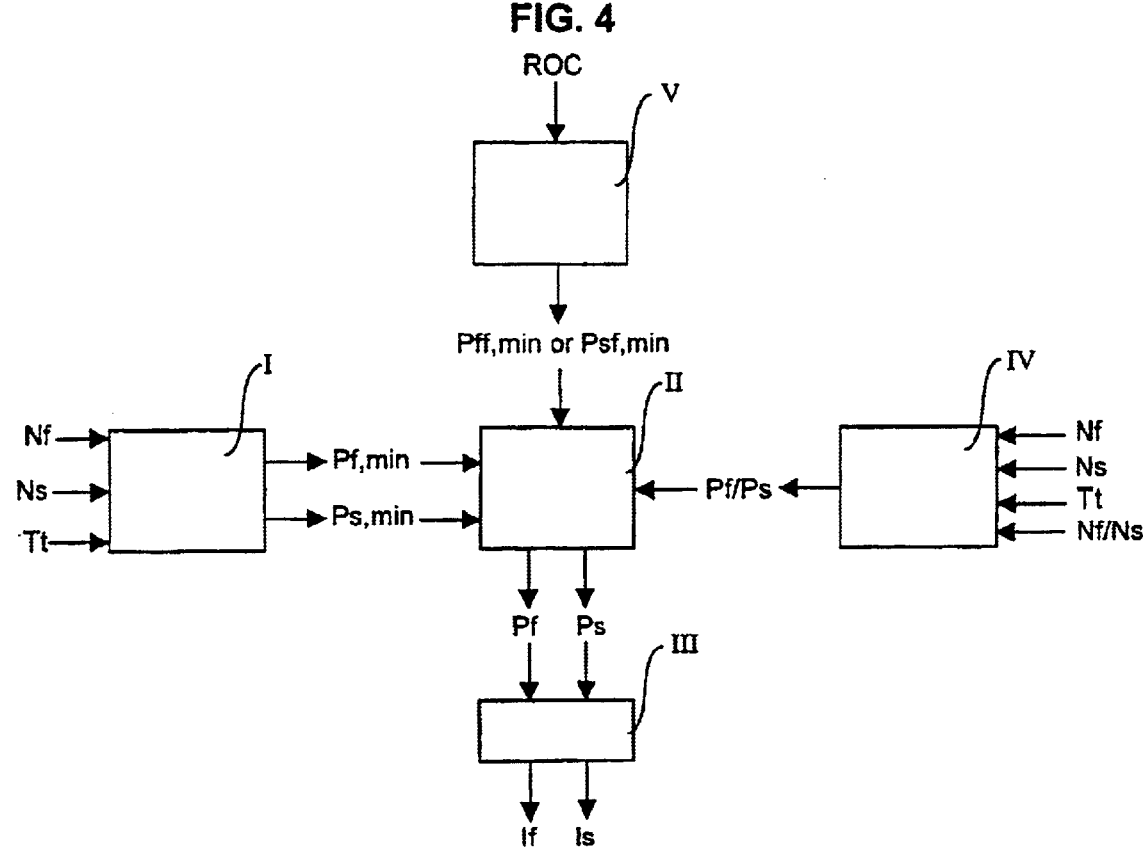
Figure 5:
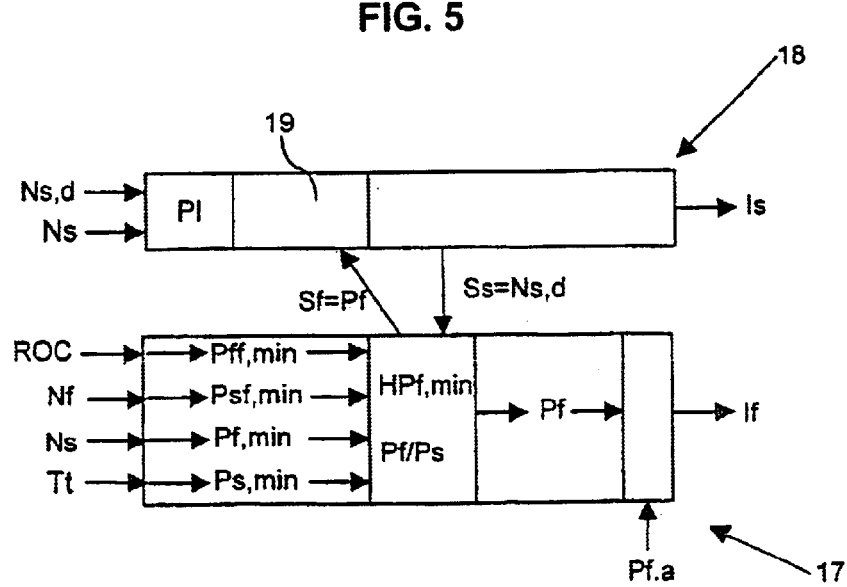

FIGS. 3 through 5 show schematic representations of the control system 15, 16, 17, 18, 19, 20, 21 according to the invention. It is noted that these specific representations are intended only for clarification of the invention. In practice the control system 15, 16, 17, 18, 19, 20, 21 according to the invention may be effected in several ways.

In FIG. 3 a graphical representation of the main function blocks I, II, III and IV which may be recognised in the control system 15, 16, 17, 18, 19, 20, 21 is shown. Block I has inputs for three signals, being a signal Nf representing the rotational speed of the first pulley 4, a signal Ns representing the rotational speed of the second pulley 5 and a signal Tt representing the torque to be transmitted by the transmission. From these three signals a minimum first cylinder pressures Pf,min and a minimum second cylinder pressure Ps,min required for torque transmission between the drive belt 1 and the pulleys 4 and 5 substantially without mutual relative movement are determined. Constants such as a coefficient of friction of the contact between pulley disc 8, 9, 10 or 11 and the drive belt 1 and a surface areas of pistons of the piston/cylinder assemblies 12, 13 are taken into account in a manner known to the man skilled in the art. Subsequently, in block II the cylinder pressures Pf and Ps are selected at least such that they are larger than the minimum required cylinder pressures Pf,min and Ps,min respectively. Finally, in block III, the control modules generates the appropriate control currents If and Is for controlling the valves so that the cylinder pressure of the first pulley 4 is equal to Pf and that the cylinder pressure of the second pulley 5 is equal to Ps. The selection of Pf and Ps made in block II usually also has to satisfy the requirement that a certain transmission ratio is obtained or maintained. To this end block IV may be present. In block IV the cylinder pressure ratio Pf/Ps of the first cylinder pressure Pf and of the second cylinder pressure Ps is determined based on the signals Nf, Ns and Tt as well as a signal Nf/Ns representing the ratio of the rotational speeds of the pulleys 4 and 5. In block II the pressures Pf and Ps may now be selected by making either Pf equal to Pf,min or Ps equal to Ps,min and by selecting the other cylinder pressure Ps or Pf respectively so that the required cylinder pressure ratio Pf/Ps is obtained. For efficiency reasons it is desirable to select the lowest possible cylinder pressures Pf and Ps, so that it may be concluded that, if the ratio of the cylinder pressure Pf of the first pulley 4 and of the cylinder pressure Ps of the second pulley 5 is larger than 1 Ps is made equal to Ps,min and if the latter ratio is smaller than 1 Pf is made equal to Pf,min.

In FIG. 4 a graphical representation of the main functional blocks I, II, III, IV and V which may be recognised in the control system 15, 16, 17, 18, 19, 20, 21 is shown. In FIG. 4 function block V has been added to the function blocks I, II, III and IV shown in FIG. 3. Block V has a signal ROC representing a desired rate of change for the transmission ratio as an input. As was explained in the above, in order to achieve a certain rate of change of the transmission ratio a further minimum cylinder pressure Pff,min, Psf,min respectively can be determined for cylinder pressure Ps, Pf respectively in the piston/cylinder assembly 12, 13 respectively of the pulley 4 or 5 which rotational speed decreases during a change of the transmission ratio. Subsequently, in block II the cylinder pressures Pf and Ps are selected at least such that they are larger than both the minimum required cylinder pressures Pf,min, Ps,min respectively and the further minimum Pff,min or Psf,min. Again, the cylinder pressure Pf and Ps must also satisfy a cylinder pressure ratio Pf/Ps as prescribed by block IV.

FIG. 5 shows a graphical representation of the electronic control unit 17, 18, 19 of a control system 15, 16, 17, 18, 19, 20, 21 particularly suited for use in combination with the so called Master/Slave hydraulic layout. The electronic control unit 17 ,18, 19 comprises separate control modules 17 and 18 for clamping force control and for transmission ratio control. The first control module 17 controls the clamping force and is capable of generating a first control current If for operating the first valve 15 of the Master/Slave hydraulic system and the second control module 18 controls the transmission ratio and is capable of generating a second control current Is for operating the second valve 16. The second control module 18 incorporates both a PI-regulator having a linear response and a linearisation module 19, so that the control of the cylinder pressure Ps of the second pulley 5 is more accurate and the transmission ratio is controllable with a high degree of accuracy. The first control module 17 determines the minimum cylinder pressures Pf,min and Ps,min and the further minimum cylinder pressure Pff,min or Psf,min, as well as a ratio of the first and second cylinder pressures Pf/Ps, based on torque signal Tt representing a torque to be transmitted by the transmission Tp multiplied by a safety factor Sf, signals Nf and Ns, respectively representing the rotational speed of the pulleys, and a signal ROC, representing a desired rate of change of the transmission ratio. Subsequently, the first control module 17 selects the cylinder pressure Pf for the first pulley 4 to be the highest HPf,min of a cylinder pressure:

given by the minimum cylinder pressure Pf,min in the piston/cylinder assembly 12 of the first pulley 4, or given by the ratio of the first and second cylinder pressures Pf/Ps and a minimum cylinder pressure Ps,min in the piston/cylinder assembly 13 of the second pulley 5, or given by the further minimum cylinder pressure Pff,min in the piston/cylinder assembly 12 of the first pulley 4, or given by the ratio of the first and second cylinder pressures Pf/Ps and a further minimum cylinder pressure Psf,min in the piston/cylinder assembly 13 of the second pulley 5.

Based on a pressure difference signal representing the difference between the highest cylinder pressure HPf,min of the first pulley 4 and the actual cylinder pressure Pf,a of the first pulley 4, measured by means of a pressure sensor, and on the pressure/current characteristic of the first valve 15, an appropriate control current If for operating the first valve 15 is generated by the first module 17.

The second control module 18 determines the transmission ratio by controlling the rotational speed of the second pulley based on a speed difference signal representing the difference between a measured rotational speed Ns of the second pulley 5 and a desired rotational speed Ns,d of the second pulley 5 which is calculated from the measured rotational speed Nf of the first pulley 4 and the desired transmission ratio Nf/Ns,d. The first and second control modules 17 and 18 are capable of mutually providing each other with a signal Sf and Ss at least representing the cylinder pressure Pf in the first piston cylinder assembly 12 and the desired rotational speed Ns,d of the second pulley 5.

Figure 6:
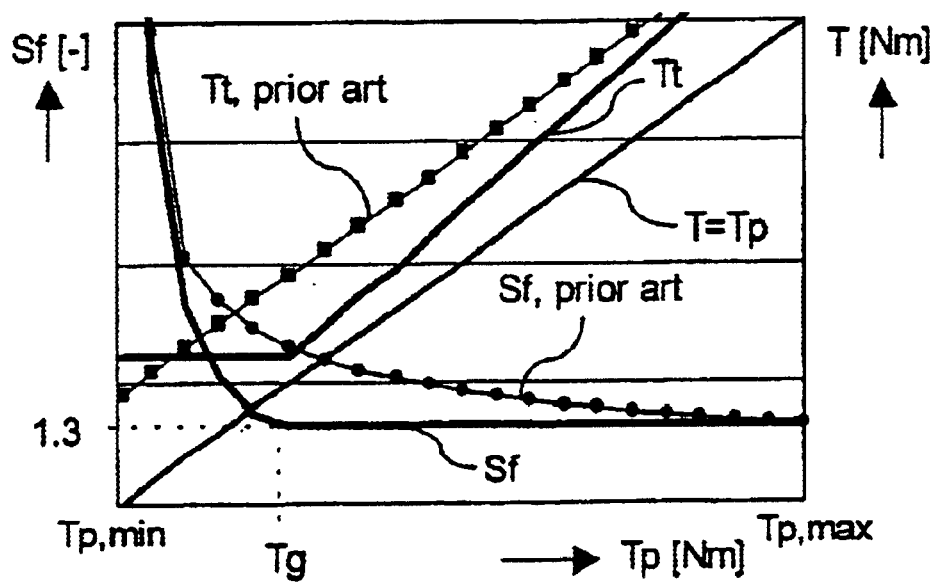
FIG. 6 shows a graph of the safety factor in relation to the actual torque.

FIG. 6 is a graph illustrating the dependency of the torque level represented by a torque signal Tt that is equal to an actual torque to be transmitted Tp multiplied by a safety factor Sf. The line T=Tp represents the actual torque to be transmitted by the transmission. The line marked 'Tt, prior art' represents the torque level represented by the signal Tt according to the prior art. After dividing Tt by Tp the dotted line is found that represents a safety factor Sf according to the prior art. It can be seen that only at the maximum torque Tp,max the safety factor Sf is equal to 1.3.

According to the invention the safety factor Sf is constant and equal to 1.3 in a large part of the range of possible torque values from Tp,min through to Tp,max as is illustrated in FIG. 6. The torque level represented by the signal Tt is thus found by multiplying Tp with 1.3. At torque values below Tg the safety factor Sf according to the invention is made to increases rapidly, so that the product of Sf and Tp remains essentially constant at 1.3 times Tg. The latter is necessary, because inevitable disturbances in the actual torque to be transmitted Tp have an absolute character, so that their influence is particularly significant in the lower part of the range of possible torque values. The strategy for the level of the safety factor according to the invention allows for a relatively simple determination of the torque signal Tt. From FIG. 6 it appears that on average the safety factor Sf according to the invention is smaller than the safety factor according to the prior art. This effect of this being that on average the clamping forces are smaller and the CVT efficiency is improved as a consequence.

Figure 7:
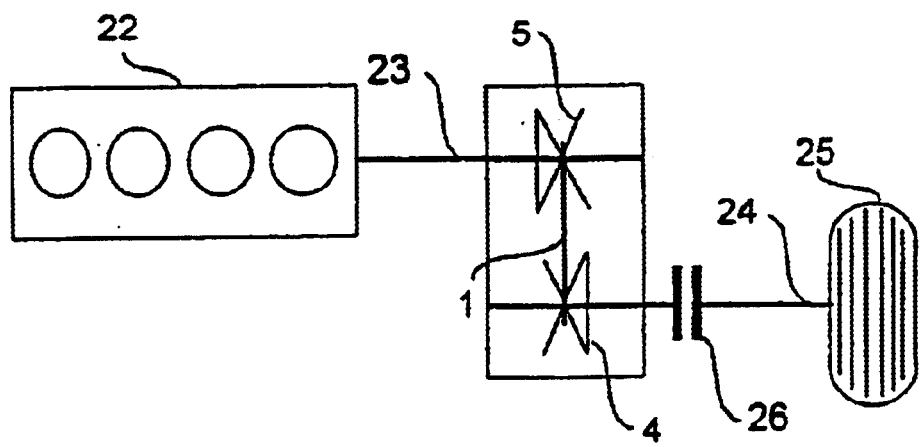
FIG. 7 shows a CVT in a vehicular drive line.

FIG. 7 shows a schematic representation of the application of a CVT in the drive line of a motor vehicle. The motor vehicle is provided with an engine 22 having an engine shaft 23. The engine shaft 23 being drivingly connected to the second pulley 5 of a CVT. The first pulley 4 of the CVT is drivingly connected to a drive shaft 24 for driving the driven wheels 25 of the motor vehicle. During operation of the motor vehicle driving power is transmitted from the engine 22 through the drive belt 1 to the driving wheels, whereby the CVT is capable continuously varying the ratio of drive shaft torque and drive shaft rotational speed. An adjustable clutch 26 may be adopted in the drive line at a location between the engine 22 and driven wheels 25. If the clutch is adjusted to be able to transmit an amount of torque which is somewhat smaller than the torque to be transmitted by the transmission Tp, the occurrence of belt slip due to unexpected changes in a drive line torque level is effectively avoided. Such unexpected changes may originate from the driven wheels 25, for example when they run over a bump or a hole in a road surface.

What is claimed is:

1. Control system (15, 16, 17, 18, 19, 20, 21) for a continuously variable transmission, the continuously variable transmission comprising a drive belt (1) located between pulley discs (8, 9, 10 and 11) of a first pulley (4) and of a second pulley (5), the pulleys (4, 5) being rotatable at a rotational speed and being operable by means of a first and a second piston/cylinder assembly (12, 13) respectively, and the control system (15, 16, 17, 18, 19, 20, 21) controls the respective cylinder pressure (Pf or Ps) in said first and second piston/cylinder assemblies (12, 13), at least based on a torque signal (Tt) representing the torque to be transmitted by the transmission and two speed signals (Nf, Ns) representing the rotational speeds (Nf, Ns) of said first and second pulley (4, 5), for clamping said drive belt (1) between said discs (8, 9, 10 and 11) thereby enabling torque transmission between said pulleys (4, 5) and said drive belt (1), wherein during operation of the transmission the control system (15, 16, 17, 18, 19, 20, 21):

determines a minimum cylinder pressure (Pf,min, Ps,min) for each of said first and said second piston/cylinder assembly (12, 13), the determination of said minimum cylinder pressures (Pf,min, Ps,min) occurring on a continuous basis, at which minimum cylinder pressure (Pf,min, Ps,min) said torque transmission occurs virtually without mutual movement of the drive belt (1) and the respective pulley discs (8, 9 and 10, 11), determines a further minimum cylinder pressure (Pff,min or Psf,min) in one of said first and second piston cylinder assembly (12, 13) based on a rate of change signal (ROC) representing a desired rate of change of the ratio of the rotational speeds of said pulleys (4, 5), at which further minimum cylinder pressure (Pff,min or Psf,min) said desired rate of change may be achieved, and controls the respective cylinder pressure (Pf or Ps) for the respective piston/cylinder assembly (12 or 13) to a level which is at any time equal to, or higher than, both of the respective minimum cylinder pressure (Pf,min, Ps,min) and of the respective further minimum cylinder pressure (Pff,min or Psf,min).

2. Control system (15, 16, 17, 18, 19, 20, 21) for a continuously variable transmission and continuously variable transmission wherein such is utilised according to claim 1, characterised in that, during operation of the transmission wherein a rate of change of the ratio of the rotational speeds of said pulleys (4, 5) is relatively large, at least one cylinder pressure (Pf or Ps) is maintained at a substantially higher level than during stationary operation of the transmission, wherein the ratio of the rotational speeds of said pulleys (4, 5) is virtually constant.

3. Control system (15, 16, 17, 18, 19, 20, 21) for a continuously variable transmission and continuously variable transmission wherein such is utilised according to claim 1, whereby an actual torque to be transmitted by the transmission (Tp) varies within a torque range (Tp,min; Tp,max) of possible values, characterised in that in a predominant part of said torque range (Tp,min; Tp,max) said torque signal (Tt) represents the actual torque to be transmitted (Tp) multiplied by a safety factor substantially equal to 1.3.

4. Control system (15, 16, 17, 18, 19, 20, 21) for a continuously variable transmission and continuously variable transmission wherein such is utilised according to claim 1, characterised in that the relationship between the rate of change, RC, of the ratio of the rotational speed of said pulleys (4, 5) and said clamping of the belt (1) between the pulley discs (8, 9, 10 and 11) is given by the equation:

$$RC = -M_{Nf/Ns} \cdot Ns \cdot Ff \cdot \left(KsKf - \frac{Fs}{Ff}\right)$$

wherein:
$M_{Nf/Ns}$ is an experimentally determined (positive) parameter which varies with the ratio of the rotational speeds of said pulleys (4, 5),
Ff is the force with which the drive belt (1) is clamped between the discs (8, 9) of the first pulley (4),
Fs is the force with which the drive belt (1) is clamped between the discs (10, 11) of the second pulley (5),
KsKf is the ratio of said forces Fs and Ff at which said rate of change would be zero, and
Ns is the rotational speed of the second pulley.

5. Control system (15, 16, 17, 18, 19, 20, 21) for a continuously variable transmission and continuously variable transmission wherein such is utilised, according to claim 1, the control system (15, 16, 17, 18, 19, 20, 21) comprising an electronic control unit (17, 18, 19) with a first control module (17) generating a first control current (If) for operating said first valve (15), a second control module (18) generating a second control current (Is) for operating the second valve (18) and a hydraulic circuit (15, 16, 20, 21) for allowing hydraulic medium to and from said first and said second piston/cylinder assembly (12, 13), said circuit at least being provided with a first valve (15), a second valve (16), a pump (20) and a reservoir for hydraulic medium (21), characterised in that,
said modules (17, 18) are capable of mutually providing each other with at least one signal (Sf, Ss),
in that a control module (17 or 18) incorporates a mathematical representation of a mass balance of the hydraulic circuit (15, 16, 20, 21)
and in that said control module (17 or 18) is capable of outputting a response signal representing a control current (If or Is) required for effecting a desired pressure response of the hydraulic circuit (15, 16, 20, 21) based on said mathematical representation.

6. Control system (15, 16, 17, 18, 19, 20, 21, 20, 21) for a continuously variable transmission and continuously variable transmission wherein such is utilised according to claim 5, characterised in that, the control system (15, 16, 17, 18, 19, 20, 21) comprises a sub-unit (19) physically separable from said control system (15, 16, 17, 18, 19, 20, 21), which sub-unit (19) contains said the mathematical representation.

7. Control system (15, 16, 17, 18, 19, 20, 21) for a continuously variable transmission and continuously variable transmission wherein such is utilised according to claim 5, the pump (20) circulating a variable flow of hydraulic medium through the hydraulic circuit (15, 16, 20, 21), characterised in that, the mathematical representation takes into account at least said flow generated by the pump, the amount of flow through the valves, and the amount of flow to and/or from the piston/cylinder assemblies.

8. Control system (15, 16, 17, 18, 19, 20, 21) for a continuously variable transmission and continuously variable transmission wherein such is utilised according to claim 7, characterised in that, the mathematical representation further takes into account leakage of hydraulic medium from the piston/cylinder assemblies (12; 13) as well as a value for the compressibility of the hydraulic medium.

9. Control system (15, 16, 17, 18, 19, 20, 21) for a continuously variable transmission and continuously variable transmission wherein such is utilised according to claim 5, wherein the first valve (15) determines the cylinder pressure (Pf) in the first piston/cylinder assembly (12) and wherein the second valve (16) determines a cylinder pressure (Ps) in the second piston cylinder assembly (13), characterised in that, the first valve (15) is a pressure control valve (15), which controls the maximum pressure in the hydraulic circuit by controlling a flow (Qsa) from the pump (20) to a reservoir (21) for hydraulic medium and in that the second valve (16) is a flow control valve (16), which controls flow (Qsp) from the pump (20) to the second piston/cylinder assembly (13) and the flow (Qpa) from the second piston/cylinder assembly (13) to said reservoir (21).

10. Control system (15, 16, 17, 18, 19, 20, 21) for a continuously variable transmission and continuously variable transmission wherein such is utilised according to claim 9, wherein the second control module (18) is capable of controlling the ratio of the rotational speeds of said pulleys (4, 5) by generating a second control current (Is), based on a difference between an actual rotational speed of the second pulley (5) and a desired rotational speed for said second pulley (5), for effecting a minimisation of said difference through adjusting the second valve (16), characterised in that, the second control module (18) controls said ratio of the rotational speeds through generating a difference signal, representing said difference, which is fed through PI-regulator having a linear response and subsequently through a linearisation module, the response of which depends on a number of transmission variables and is based on a linearisation algorithm, the output signal of said linearisation module being the second control current (Is) and in that said modules (17, 18) are capable of mutually providing each other with at least one signal (Sf, Ss), representing respectively the cylinder pressure (Pf) in the first piston/cylinder assembly (12, 13) and said desired rotational speed of the second pulley (5).

11. Control system (15, 16, 17, 18, 19, 20, 21) for a continuously variable transmission and continuously variable transmission wherein such is utilised according to claim 10, characterised in that, the linearisation module at least comprises the mathematical representation of said mass balance of the hydraulic circuit (15, 16, 20, 21).

12. Control system (15, 16, 17, 18, 19, 20, 21) for a continuously variable transmission and continuously variable transmission wherein such is utilised according to claim 9, characterised in that, the first control module (17) is capable of controlling said clamping of the drive belt (1) by generating a control current (If) for controlling the first valve (15) so that the cylinder pressure (Pf) in the piston/cylinder assembly (12) of the first pulley (4) is equal to the highest value of either:
a minimum pressure (Pf,min) at which torque transmission between the first pulley (4) and the drive belt (1) occurs virtually without mutual movement, or
a minimum pressure required for the cylinder pressure (Ps) in the piston/cylinder assembly (13) of the second variable pulley (5) to become equal to a minimum cylinder pressure (Ps,min) at which torque transmission between the second pulley (5) and the drive belt (1) occurs virtually without mutual movement, or
a minimum pressure (Pff,min) at which the ratio of the rotational speed of the first and the second pulley (4, 5) decreases at a desired rate of change, or a minimum pressure required for the cylinder pressure (Ps) in the piston/cylinder assembly (13) of the second variable pulley (5) to become equal to a further minimum cylinder pressure (Psf,min) at which the ratio of the rotational speed of the first and the second pulley (4, 5) increases at a desired rate of change.

13. Control system (15, 16, 17, 18, 19, 20, 21) for a continuously variable transmission and continuously variable transmission wherein such is utilised according to claim 1, characterised in that, the control system (15, 16, 17, 18, 19, 20, 21) is provided with change rate restriction means for reducing said desired rate of change of the ratio of the rotational speed of said pulleys (4, 5).

14. Control system (15, 16, 17, 18, 19, 20, 21) for a continuously variable transmission and continuously variable transmission wherein such is utilised according to claim 13, characterised in that, said change rate restriction means are capable of determining the flow generated by the pump (Qop) and a flow required for changing the ratio of said rotational speeds at a desired rate of change, and of reducing said desired rate of change when said flow generated by the pump (Qop) is smaller than the flow required for changing the ratio of said rotational speeds.

15. Control system (15, 16, 17, 18, 19, 20, 21) for a continuously variable transmission and continuously variable transmission wherein such is utilised according to claim 13, characterised in that, said change rate restriction means are capable of determining an actual cylinder pressure (Pf or Ps) and a cylinder pressure required for changing the ratio of said rotational speeds at a desired rate of change, and of reducing said desired rate of change when said actual cylinder pressure (Pf or Ps) is smaller than the cylinder pressure required for changing the ratio of said rotational speeds.

16. Control system (15, 16, 17, 18, 19, 20, 21) for a continuously variable transmission and continuously variable transmission wherein such is utilised according to claim 1 wherein the cylinder pressure (Pf) in the first piston/cylinder assembly (12) is measured by means of a pressure sensor, characterised in that, the control system (15, 16, 17, 18, 19, 20, 21) is provided with calculating means for calculating the cylinder pressure (Ps) in the second piston/cylinder assembly (13) based signals at least representing said cylinder pressure (Pf) in the first piston/cylinder assembly (12), the rotational speed of the first pulley (4) and the rotational speed of the second pulley (5).

17. Motor vehicle provided with an engine (22) having an engine shaft (23), the continuously variable transmission according to claim 1, and a drive shaft (24) for driving driven wheels (25) of the motor vehicle, characterised in that, the first pulley (4) is drivingly connected to the drive shaft (24) and the second pulley (5) is drivingly connected to the engine shaft (23).

18. Motor vehicle according to claim 17, characterised in that, the motor vehicle comprises an adjustable clutch (26), which clutch (26) is adjusted to be capable of transmitting a maximum amount of torque from the engine (22) to the driven wheels (25), said maximum amount of torque being smaller than a torque transmittable by the continuously variable transmission without relative movement between the drive belt (1) and the pulley discs (8, 9, 10 and 11).

19. Control system for a continuously variable transmission having a drive belt (1) located between pulley discs (8, 9, 10 and 11) of a first pulley (4) and of a second pulley (5), the pulleys (4, 5) being rotatable at a rotational speed and being operable by means of a first and a second piston/cylinder assembly (12, 13) respectively, the control system comprising:

control system elements that (15, 16, 17, 18, 19, 20, 21) control the respective cylinder pressure (Pf or Ps) in the first and second piston/cylinder assemblies (12, 13), at least based on a torque signal (Tt) representing the torque to be transmitted by the transmission and two speed signals (Nf, Ns) representing the rotational speeds (Nf, Ns) of the first and second pulley (4, 5), for clamping the drive belt (1) between the discs (8, 9, 10 and 11) thereby enabling torque transmission between the pulleys (4, 5) and the drive belt (1), wherein during operation of the transmission the control system (15, 16, 17, 18, 19, 20, 21)

1) determines a minimum cylinder pressure (Pf,min, Ps,min) for each of the first and the second piston/cylinder assembly (12, 13), the determination of the minimum cylinder pressures (Pf,min, Ps,min) occurring on a continuous basis, at which minimum cylinder pressure (Pf,min, Ps,min) the torque transmission occurs virtually without mutual movement of the drive belt (1) and the respective pulley discs (8, 9 and 10, 11), 2) determines a further minimum cylinder pressure (Pff, min or Psf,min) in one of the first and second piston cylinder assembly (12, 13) based on a rate of change signal (ROC) representing a desired rate of change of the ratio of the rotational speeds of the pulleys (4, 5), at which further minimum cylinder pressure (Pff,min or Psf,min) the desired rate of change may be achieved, and 3) controls the respective cylinder pressure (Pf or Ps) for the respective piston/cylinder assembly (12 or 13) to a level which is at any time equal to, or higher than, both of the respective minimum cylinder pressure (Pf,min, Ps,min) and of the respective further minimum cylinder pressure (Pff,min or Psf,min).

* * * * *